(12) United States Patent
Kim et al.

(10) Patent No.: US 7,990,437 B2
(45) Date of Patent: Aug. 2, 2011

(54) COLOR CORRECTION IN CMOS IMAGE SENSOR

(75) Inventors: Bum-Suk Kim, Seoul (KR); Alexander Getman, Yongin-si (KR); Jong-Jin Lee, Seoul (KR); Yun-Ho Jang, Seoul (KR); Jung-Chak Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 998 days.

(21) Appl. No.: 11/811,630

(22) Filed: Jun. 11, 2007

(65) Prior Publication Data

US 2008/0018757 A1    Jan. 24, 2008

(30) Foreign Application Priority Data

Jul. 18, 2006  (KR) .................... 10-2006-0067022

(51) Int. Cl.
*H04N 5/262*  (2006.01)
*H04N 9/73*  (2006.01)
(52) U.S. Cl. ................. 348/240.2; 348/223.1
(58) Field of Classification Search .............. None
See application file for complete search history.

(56) References Cited

U.S. PATENT DOCUMENTS

| 7,151,560 | B2* | 12/2006 | Matherson et al. | 348/187 |
| 2005/0185836 | A1* | 8/2005 | Huang | 382/162 |
| 2005/0219259 | A1* | 10/2005 | Gonsalves et al. | 345/593 |
| 2005/0253942 | A1* | 11/2005 | Muramatsu et al. | 348/273 |
| 2006/0087702 | A1* | 4/2006 | Satoh et al. | 358/461 |
| 2006/0268119 | A1* | 11/2006 | Sugawara | 348/223.1 |

OTHER PUBLICATIONS

Korean Patent Application No. 1020040097138 to Song et al., having Publication date of May 29, 2006 (w/ English Abstract page).
Korean Patent Application No. 1020040071794 to Jin, having Publication date of Mar. 13, 2006 (w/ English Abstract page).
Japanese Patent Application No. 09-072868 to Masaharu, having Publication date of Oct. 9, 1998 (w/ English Abstract page).
Japanese Patent Application No. 2000-067384 to Shinichi, having Publication date of Sep. 21, 2001 (w/ English Abstract page).
Japanese Patent Application No. 2002-154407 to Yasushi, having Publication date of Dec. 5, 2003 (w/ English Abstract page).

* cited by examiner

*Primary Examiner* — Lin Ye
*Assistant Examiner* — Euel K Cowan
(74) *Attorney, Agent, or Firm* — Monica H. Choi (57) ABSTRACT

For color correction in an image sensor, an image sensor processing block generates a plurality of color correction parameters corresponding to a plurality of selected pixels of the image sensor for defining a plurality of areas of a sample image. In addition, a color correction value calculation block generates a respective color correction value corresponding to a given pixel from bilinear interpolation of a respective subset of the color correction parameters corresponding to a respective one of the areas including a respective location of the given pixel.

21 Claims, 10 Drawing Sheets

Before correction
(A)

After correction
(B)

COLOR CORRECTION IN CMOS IMAGE SENSOR

This application claims priority under 35 U.S.C. §119 to Korean Patent Application No. 2006-67022, filed on Jul. 18, 2006 in the Korean Intellectual Property Office, the disclosure of which is incorporated herein in its entirety by reference.

BACKGROUND OF THE INVENTION

1. Field of the Invention

The present invention relates generally to CMOS image sensors, and more particularly to using interpolation for color correction in a CMOS image sensor.

2. Background of the Invention

An image sensor is generally classified into a CCD (charge coupled device) image sensor or a CMOS (complementary metal-oxide semiconductor) image sensor (CIS). Compared to the CCD, the CIS is fabricated economically with a general CMOS process and is advantageous for integration of analog/digital signal processing circuits. Also, the CIS which is amenable to low power and low voltage design is widely used in portable devices such as mobile phones or digital cameras.

The CIS includes an array of pixels each being activated with timing control for outputting a respective image signal corresponding to received light. A color filter array (CFA) having a color pattern such as the Bayer color pattern is installed on the CIS such that each pixel detects the intensity of light of a respective color such as red (R), green (G), or blue (B) for example. In particular, the G of the Bayer CFA is one of Gr or Gb with Gr being located between neighboring R and other G pixels and Gb being located between B and other G pixels.

Although each pixel senses light of a respective color, color interpolation or demosaicing algorithms are used to determine the color components R, B, and G (including Gr and Gb) for each pixel of the pixel array. The difference between the Gr and Gb is ideally "0" for each pixel. When the difference between the Gr and Gb color components is not "0", noise may be generated when displaying the image by as much as the difference between the Gr and Gb color components.

Each pixel of the CIS pixel array uses transistors and a pixel diode such as four MOS transistors for a 4-Tr structure. The photodiode accumulates electric charge corresponding to the intensity of received light. The transistors are used for controlling the timing of transmission of the accumulated electric charge from the photodiode to a floating diffusion node and for amplifying the voltage at the floating diffusion node for generating an output voltage corresponding to the accumulated electric charge.

The pixel size of the CMOS image sensor is gradually decreased according to demand for high resolution. Thus, multiple pixels of the CMOS image sensor may share transistors, the photodiode, or/and the floating diffusion node. However, sharing of such components may result in variance in the output voltages generated by such sharing pixels because of irregular arrangement and layout of such shared components in the sharing pixels. Thus, a defective color tone may result in the image with a difference between the Gr and Gb color components.

SUMMARY OF THE INVENTION

Accordingly, the present invention compensates for such defective color tone using bilinear interpolation at each pixel.

For color correction in an image sensor, an image sensor processing block generates a plurality of color correction parameters corresponding to a plurality of selected pixels of the image sensor for defining a plurality of areas of a sample image. Each color correction parameter represents a difference between at least two color components such as the Gr and Gb color components for a respective one of the selected pixels. In addition, a color correction value calculation block generates a respective color correction value corresponding to a given pixel from interpolation of a respective subset of the color correction parameters corresponding to a respective one of the areas including a respective location of the given pixel.

In an example embodiment of the present invention, the image sensor processing block includes a data processor and a memory device having sequences of instructions stored thereon. Execution of the sequences of instructions by the data processor causes the data processor to perform the steps of:

receiving the sample image from a pixel array of the image sensor;

dividing the sample image into a plurality of rectangles; and determining a respective color correction parameter for each corner point of the rectangles, wherein the selected pixels are at the corner points of the rectangles.

In another embodiment of the present invention, the color correction value calculation block includes a data processor and a memory device having sequences of instructions stored thereon. Execution of the sequences of instructions by the data processor causes the data processor to perform the steps of:

determining the respective subset of the color correction parameters corresponding to the respective location of the given pixel; and determining the respective color correction value by performing bilinear interpolation with the respective subset of the color correction parameters from the respective location of the given pixel.

In a further embodiment of the present invention, execution of the sequences of instructions by the data processor of the color correction value calculation block causes such a data processor to further perform the steps of:

modifying the color correction parameters according to a zoom magnification value of the image sensor;

determining the respective subset of the modified color correction parameters corresponding to the respective location of the given pixel; and determining the respective color correction value by performing bilinear interpolation with the respective subset of the modified color correction parameters from the respective location of the given pixel.

In another embodiment of the present invention, a color correction value compensation block generates a respective color corrected image signal from a respective original image signal and the respective color correction value for the given pixel.

In an example embodiment of the present invention, the color correction value compensation block includes a data processor and a memory device having sequences of instructions stored thereon. Execution of the sequences of instructions by the data processor causes the data processor to perform the step of:

generating the respective color corrected image signal by adjusting at least one color component of the given pixel according to the respective color correction value.

The present invention may be used to particular advantage when the image sensor is a CMOS (complementary metal oxide semiconductor) image sensor.

In this manner, color correction is performed using bilinear interpolation at each pixel according to the subset of color correction parameters representing the respective area of the pixel on the pixel array. Such color correction removes defective color tone in the image captured by the image sensor.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7A, 7B, 8A, 8B, 9 and 10 refer to elements having similar structure and/or function.

DETAILED DESCRIPTION OF THE INVENTION

Figure 1:
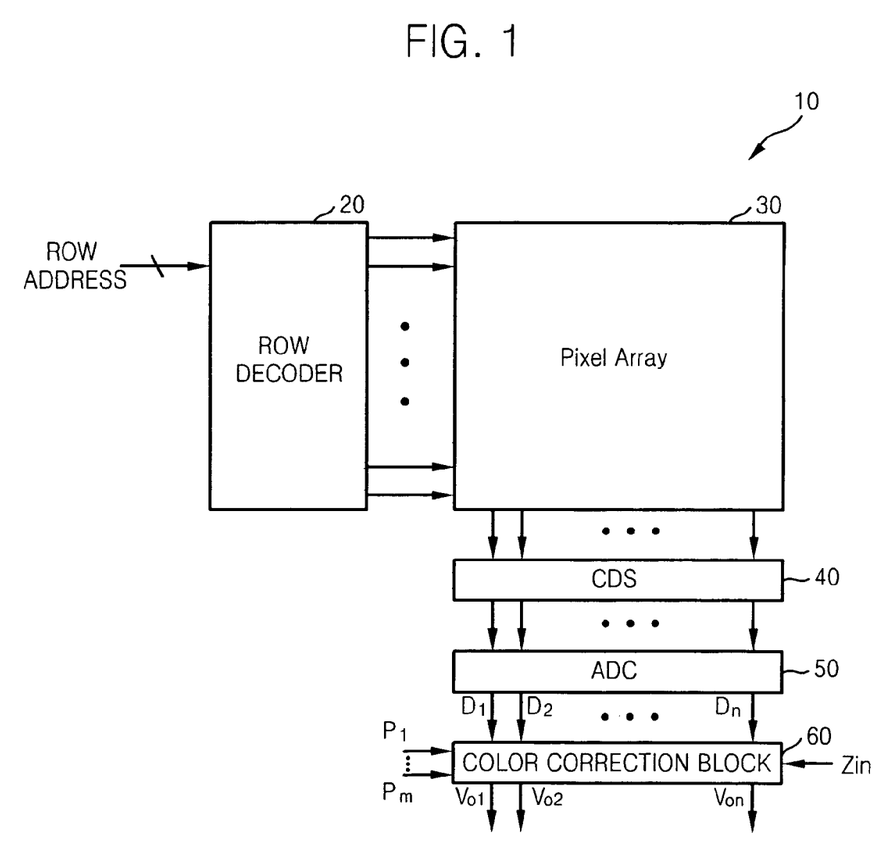
FIG. 1 is a block diagram of an image sensor having a color correction block according to an embodiment of the present invention.
Figure 2:
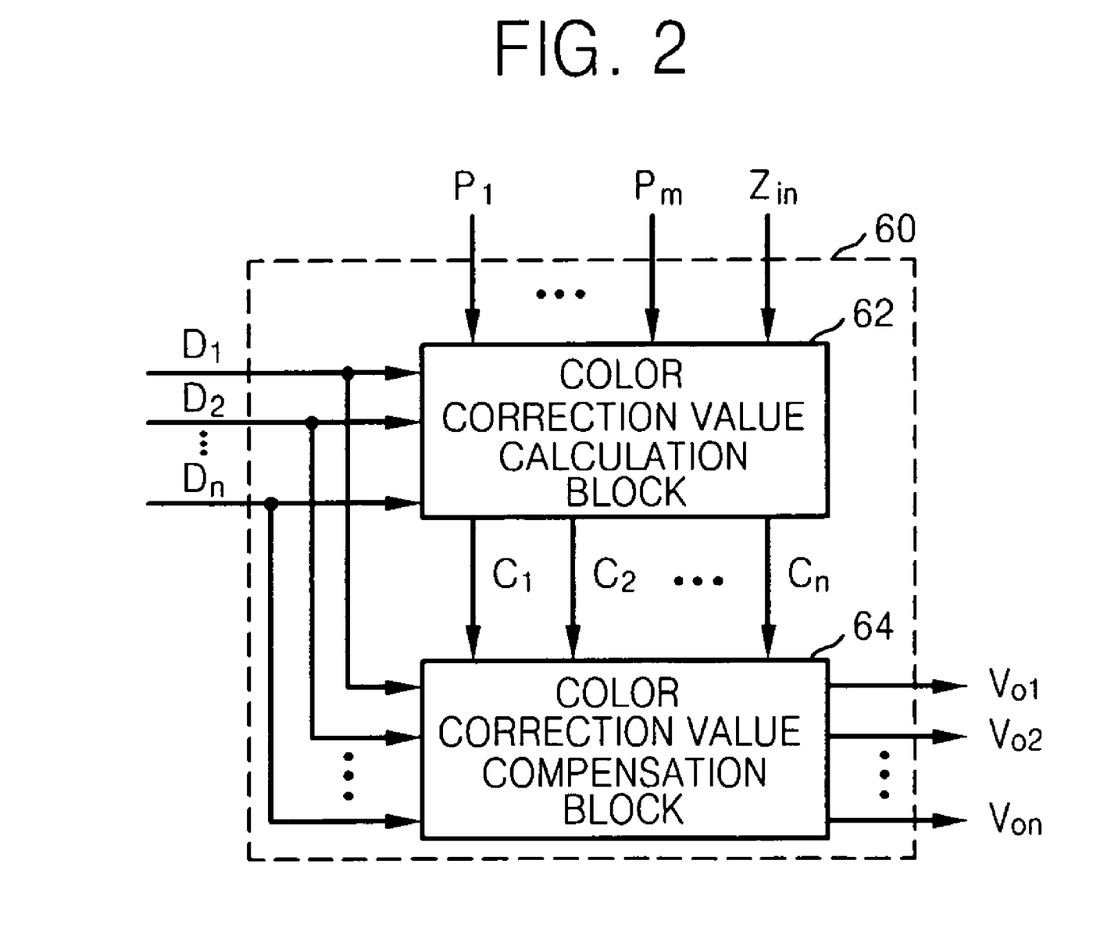
FIG. 2 is a block diagram of the color correction block of FIG. 1 according to an embodiment of the present invention.

FIG. 1 is a block diagram of an image sensor 10 having a color correction block 60 according to an embodiment of the present invention. FIG. 2 is a block diagram of the color correction block 60 of FIG. 1. Referring to FIGS. 1 and 2, the image sensor 10 includes a row decoder 20, a pixel array 30, a CDS (Correlated Double Sampling) block 40, an analog-to-digital converter (ADC) 50, and the color correction block 60.

The row decoder 20 generates control signals for activating a row of pixels of the pixel array 20 based on a row address received from a controller (not shown). The pixel array 30 has a plurality of pixels (not shown) arranged as a two-dimensional matrix. Each of the activated pixels outputs a respective reset signal and a respective charge signal. The CDS block 40 receives such signals for performing correlated double sampling to generate correlated image signals. The ADC 50 converts the images signals from the CDS block 40 to generate digital image signals $D_1, D_2, \ldots,$ and $D_n$, each corresponding to a respective pixel of the activated row of pixels.

In one example embodiment of the present invention, n digital image signals $D_1, D_2, \ldots,$ and $D_n$ are generated for the n-pixels in the activated row of the pixel array 30. The color correction block 60 receives the digital image signals $D_1, D_2,$ and $D_n$ and m color correction parameters $P_1$ through $P_m$ and outputs n corrected image data $V_{o1}, V_{o2}, \ldots,$ and $V_{on}$, with m and n each being a respective natural number in one embodiment of the present invention.

Figure 9:
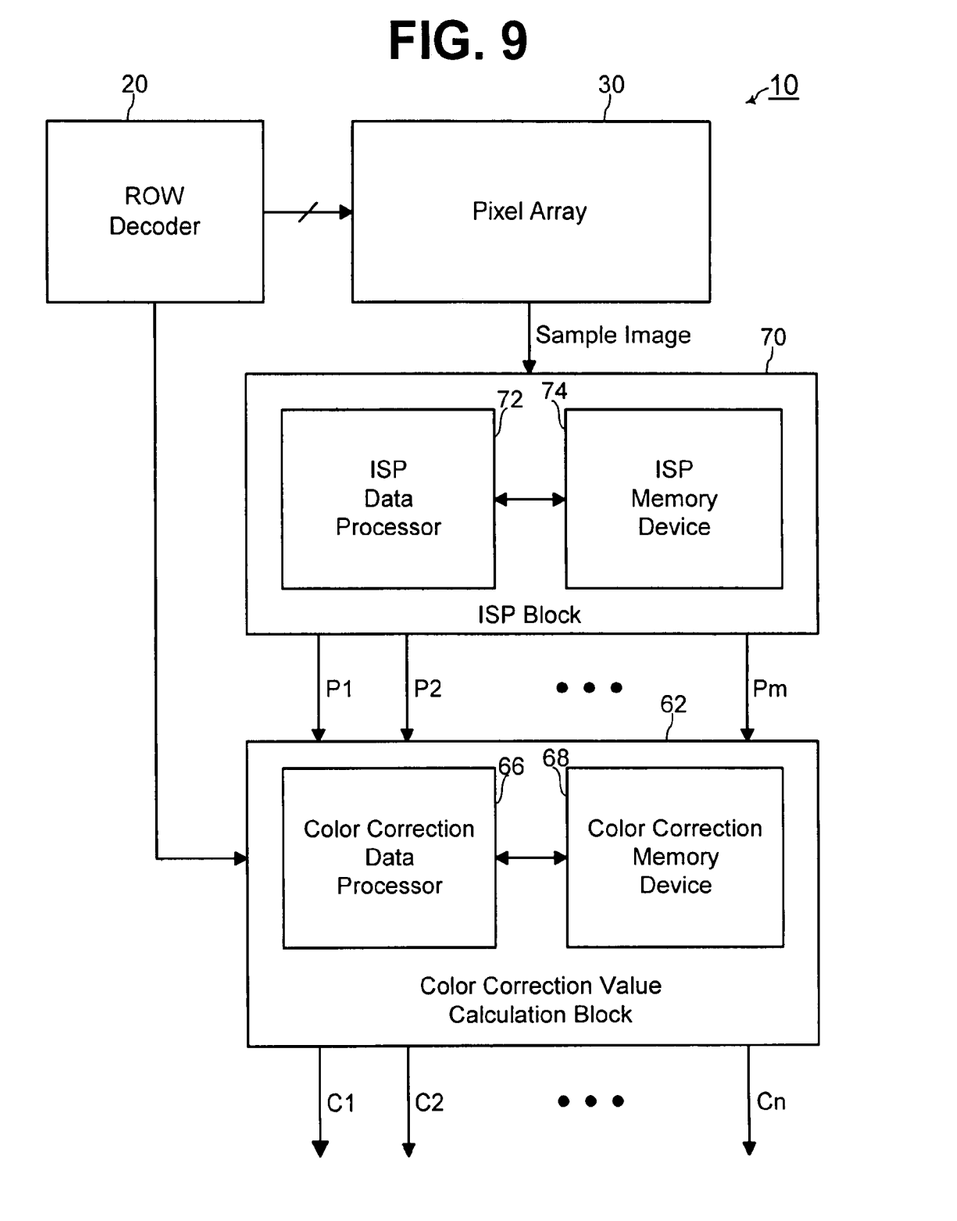
FIG. 9 shows a block diagram for an example implementation of the image sensor of FIG. 1, according to an embodiment of the present invention.

Referring to FIGS. 1 and 2, the color correction block 60 includes a color correction value calculation block 62 and a color correction value compensation block 64. FIG. 9 shows an example embodiment of the image sensor 10 further including an ISP (image sensor processing) block 70. Referring to FIG. 9, the ISP block 70 includes an ISP data processor 72 and an ISP memory device 74 having sequences of instructions (i.e., software) stored thereon. Execution of such sequences of instructions by the ISP data processor 72 causes the ISP data processor 72 to perform any steps/functions attributed to being performed by the ISP block 70 in reference to the flow-chart of FIG. 6.

Further referring to FIG. 9, the color correction value calculation block 62 includes a color correction data processor 66 and a color correction memory device 68 having sequences of instructions (i.e., software) stored thereon. Execution of such sequences of instructions by the color correction data processor 66 causes the color correction data processor 66 to perform any steps/functions attributed to being performed by the color correction value calculation block 62 in reference to the flow-chart of FIG. 6.

Figure 10:
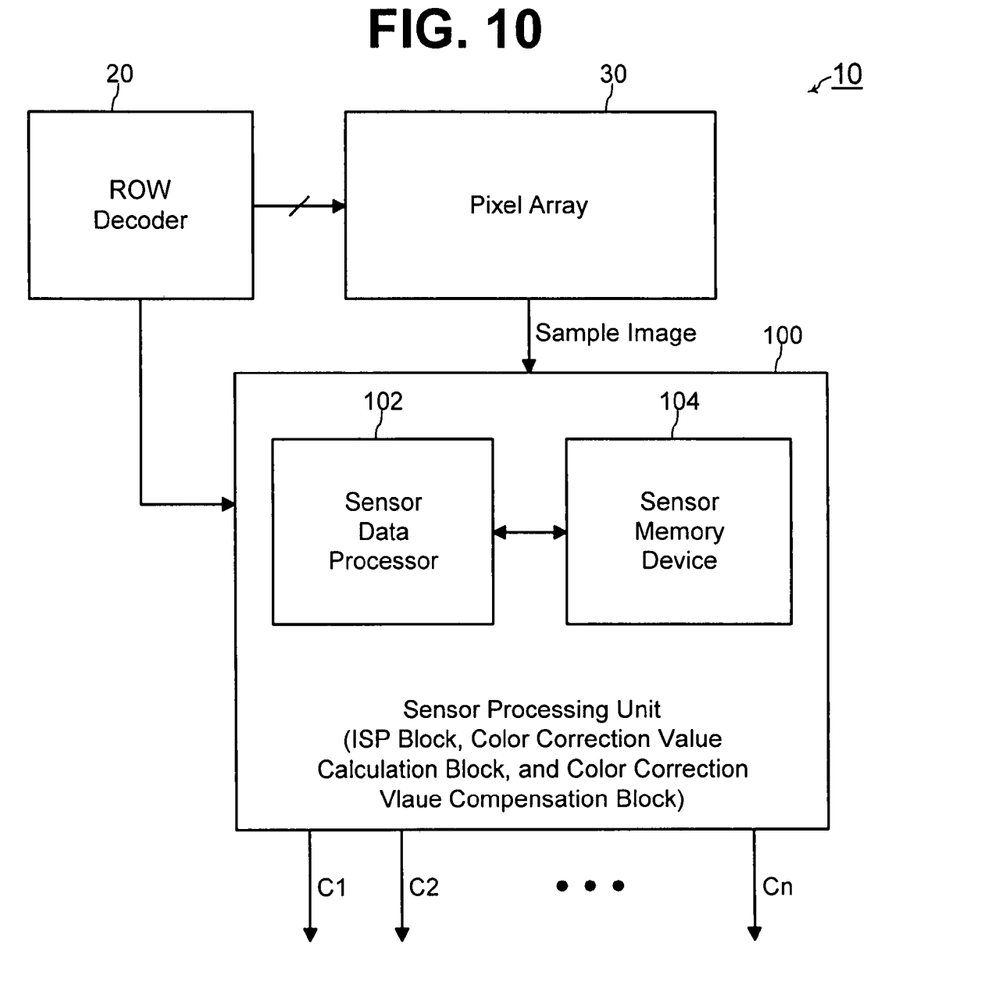
FIG. 10 shows a block diagram for another example implementation of the image sensor of FIG. 1, according to another embodiment of the present invention.

Referring to FIG. 10 for another embodiment of the present invention, the ISP block 70, the color correction value block 62, and the color correction value compensation block 64 are implemented by one sensor data processor 102 and one sensor memory device 104 of a sensor processing unit 100. The sensor memory device 104 has sequences of instructions (i.e., software) stored thereon, and execution of such sequences of instructions by the sensor data processor 104 causes the sensor data processor 104 to perform any steps/functions attributed to being performed by the ISP block 70, the color correction value calculation block 62, and the color correction value compensation block 64, in reference to the flow-chart of FIG. 6.

Figure 5:
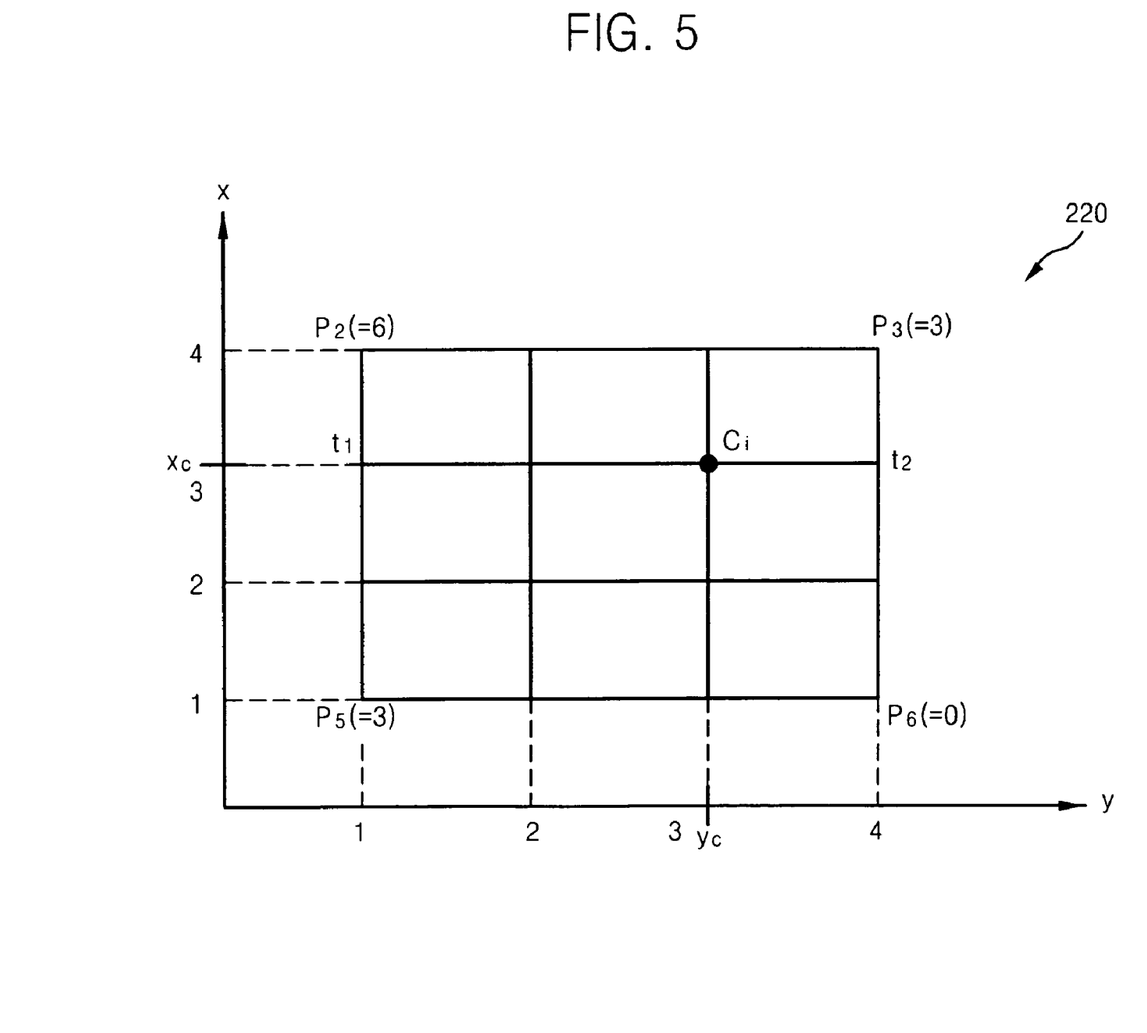
Figure 6:
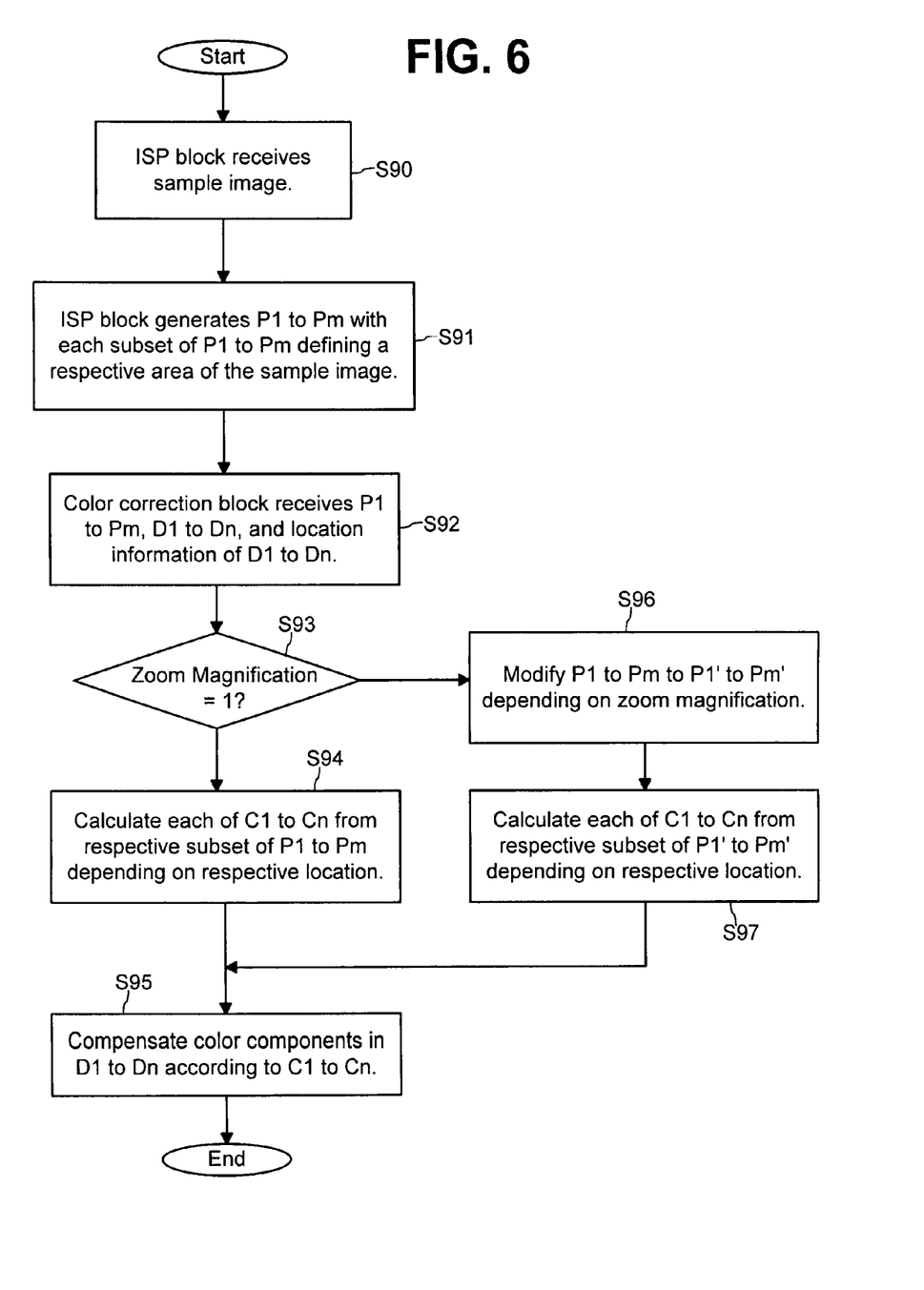
FIG. 6 is a flow chart of steps during operation of the color correction block of FIG. 2 and an image sensor processing unit, according to an embodiment of the present invention.

In FIG. 6, steps S90 and S91 are performed by the ISP block 70, steps S92, S93, S94, S96, and S97 are performed by the color correction value calculation block 62, and steps S95 is performed by the color correction value compensation block 64. Operation of the image sensor 10 of FIGS. 1, 2, 9, and/or 10 is now described in reference to FIGS. 3, 4, 5, and 6.

Figure 3:
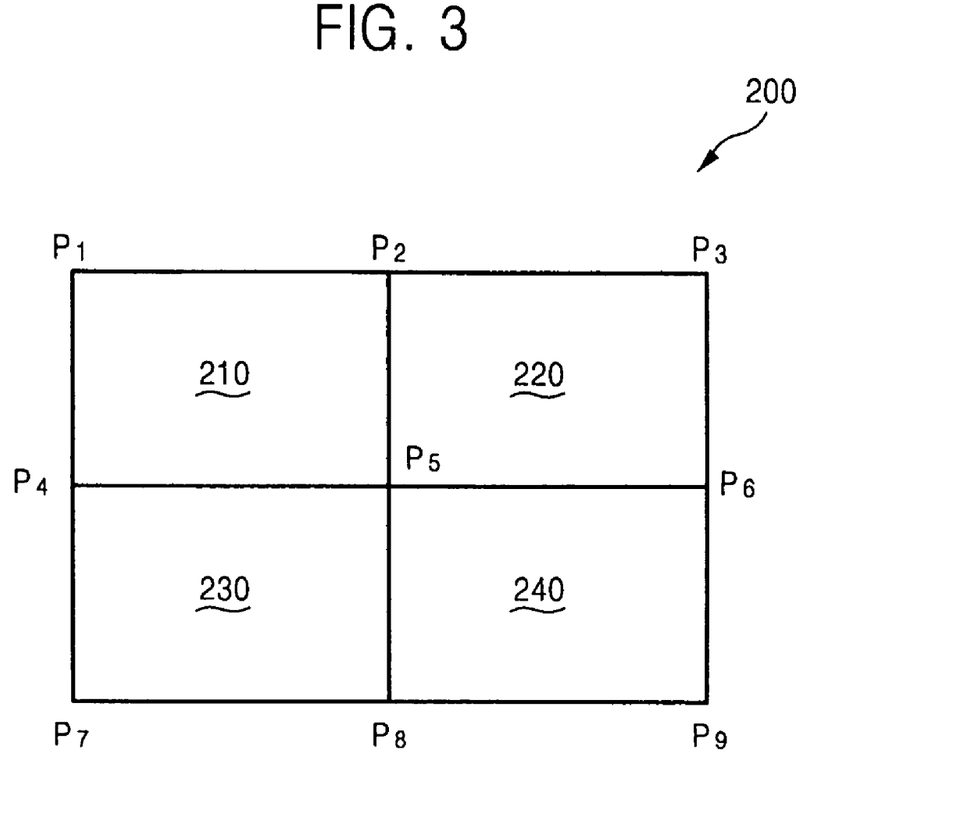
FIG. 3 illustrates generation of color correction parameters by dividing a sample image into predetermined areas, according to an embodiment of the present invention.

Referring to FIG. 3, for generating the m color correction parameters $P_1$ through $P_m$, the ISP block 70 receives a sample image 200 of FIG. 3 as sensed by the pixel array 30 (step S90 of FIG. 6). The ISP block 70 generates the m color correction parameters $P_1$ through $P_m$ from dividing the sample image 300 into a plurality of areas such as a first area 210, a second area 220, a third area 230, and a fourth area 240 (step S91 of FIG. 6). Such areas 210, 220, 230, and 240 are each a rectangle in the example embodiment of FIG. 3.

Each of the color correction parameters $P_1$ through $P_m$ is generated for a respective selected pixel located at a respective one of the corners of the rectangles 210, 220, 230, and

240. Each color correction parameter Pi is a percent difference between the respective green-red Gr color component and the respective green-blue color component Gb for the respective selected pixel at a respective one of the corners defined by the rectangles 210, 220, 230, and 240 as indicated by the following Equation 1:

$$Pi = \frac{Gr - Gb}{G} \times 100(\%) \qquad \text{[Equation 1]}$$

G which is a reference value such as a square root mean of Gr and Gb (i.e., G is the square root of a sum of $Gr^2$ and $Gb^2$), in one example embodiment of the present invention. In the example of FIG. 3, m=9, and Pi is determined for the respective selected pixel at each of the nine corners defined by the rectangular areas 210, 220, 230, and 240.

For color correction, Gr is desired to be equal to Gb at each pixel of the pixel array 30. If $P_i$ is a positive number, Gr is greater than Gb indicating that Gb may be increased for compensation. If $P_i$ is a negative number, Gb is greater than Gr indicating that Gr may be increased for compensation.

Further referring to FIG. 3, note that each of the rectangular areas 210, 220, 230, and 240 is defined by a respective subset of the color correction parameters P4, through $P_m$. A first subset of color correction parameters P1, P2, P4, and P5 defines the first area 210. A second subset of color correction parameters P2, P3, P5, and P6 defines the second area 220. A third subset of color correction parameters P4, P5, P7, and P8 defines the third area 230. A fourth subset of color correction parameters P5, P6, P8, and P9 defines the fourth area 240.

Subsequently, the color correction value calculation block 62 receives such color correction parameters $P_1$ through $P_m$ from the ISP block 70 and location information for the n pixels generating the n digital image signals $D_1, D_2, \ldots,$ and $D_n$ (step S92 of FIG. 6) For example, the row decoder 20 sends control information to the color correction value calculation block 62 indicating the address of the activated row of pixels generating the n digital image signals $D_1, D_2, \ldots,$ and $D_n$ for indicating the location of each of such n pixels.

In addition, the color correction value calculation block 62 determines whether the zoom magnification Zin is equal to one (step S93 of FIG. 6). If the zoom magnification Zin is equal to one, then the color correction value calculation block 62 determines the color correction values $C_1, C_2, \ldots,$ and $C_n$ from the originally received color correction parameters $P_1$ through $P_m$ (step S94 of FIG. 6).

Alternatively, if the zoom magnification Zin is not equal to one, then the color correction value calculation block 62 determines the color correction values $C_1, C_2, \ldots$ and $C_n$ after modification of the received color correction parameters $P_1$ through $P_m$ (steps S96 and S97 of FIG. 6). For example, the memory device 68 or 104 of the color correction value calculation block 62 has stored therein a first set of the color correction parameters $P_1$ through $P_m$ for when the zoom magnification Zin is equal to "1". In addition, such a memory device 68 or 104 of the color correction value calculation block 62 has stored therein a second set of the color correction parameters $P_1''$ through $Pm''$ for when the zoom magnification Zin is equal to "3".

As a result, the color correction value calculation block 62 determines a modified set of color correction parameters $P_1'$ through $P_m'$ from interpolation between such first and second sets of the stores color correction parameters depending on the zoom magnification Zin (step S96 of FIG. 6). For example, if the zoom magnification Zin is "2.5", the color correction value calculation block 62 determines each of the modified color correction parameters $P_1'$ through $P_m'$ as a respective one of the first color correction parameters $P_1$ through $P_m$ subtracted from a respective one of the second color correction parameters $P_1'$ through $P_m'$, and by multiplying each of such subtraction results by "1.5".

In the case that the modified color correction parameters $P_1'$ through $P_m'$ are generated when the zoom magnification Zin is not equal to one, the color correction value calculation block 62 determines the color correction values $C_1, C_2, \ldots,$ and $C_n$ from the modified color correction parameters $P_1'$ through $P_m'$ (step S97 of FIG. 6).

Figure 4:
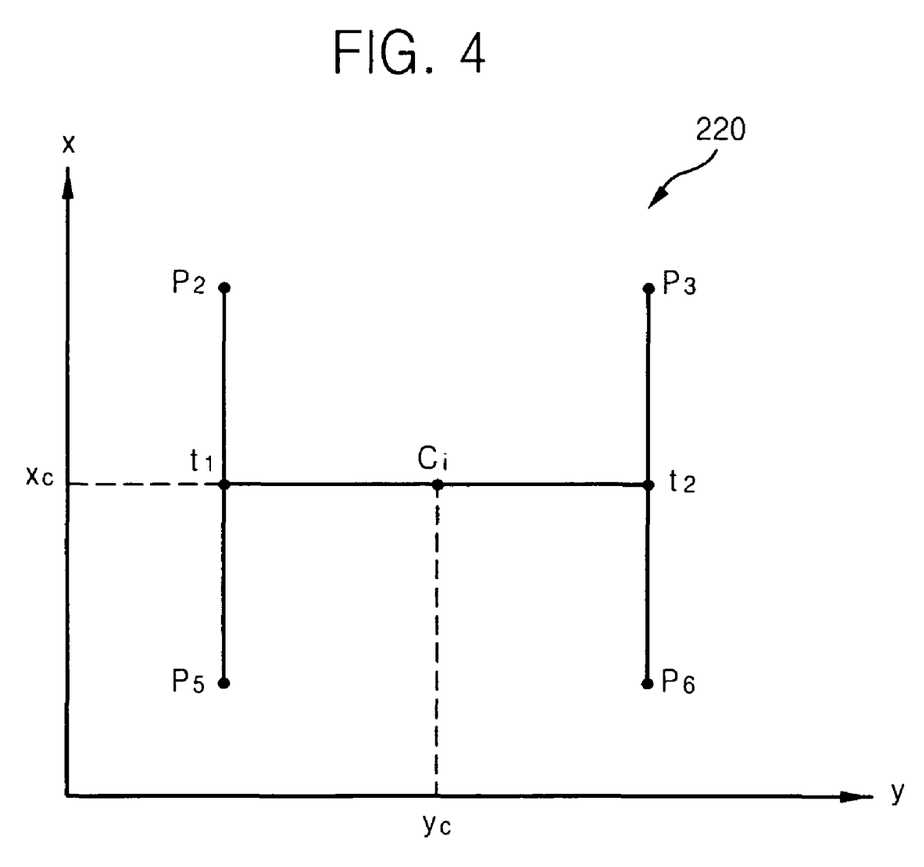
FIGS. 4 and 5 illustrate bilinear interpolation for determining a color correction value at an example pixel location from the color correction parameters of FIG. 3, according to an embodiment of the present invention.

In either step S94 or S97, the color correction value calculation block 62 uses bilinear interpolation for determining each of the color correction values $C_1, C_2, \ldots,$ and $C_n$ as illustrated in an example of FIGS. 4 and 5. Each of the color correction values $C_1, C_2, \ldots,$ and $C_n$ corresponds to a respective pixel generating the respective one of the image signals $D_1, D_2, \ldots,$ and $D_n$.

For the example of FIGS. 4 and 5, assume that the zoom magnification Zin is equal to "1". For an example color correction value Ci in FIGS. 4 and 5, the color correction value calculation block 62 determines one of the areas 210, 220, 230, and 240 having a location of a respective pixel generating the respective image signal Di to be color-corrected with the example color correction value Ci. In addition, the color correction value calculation block 62 determines a respective subset of the color correction parameters $P_1$ through $P_m$ corresponding to the four corners of the area corresponding to the example color correction value Ci.

In the example of FIGS. 4 and 5, the second area 220 includes the location of the respective pixel generating the respective image signal Di to be color-corrected with the example color correction value Ci. Thus, the corresponding subset of color correction parameters P2, P3, P5, and P6 are bilinear interpolated for determining the example color correction value Ci.

For determining the color correction value Ci with such bilinear interpolation, the color correction value calculation block 62 assigns x and y coordinate values to the corresponding subset of color correction parameters P2, P3, P5, and P6 and the corresponding location for Ci, as illustrated in FIGS. 4 and 5. Generally, the following interpolation Equation 2 is used for bilinear interpolation in an example embodiment of the present invention:

$$C = \text{Int}(a, b, x) = \frac{a(xb - x) + b(x - xa)}{xb - xa} \qquad \text{[Equation 2]}$$

Here, x is an x-coordinate value assigned to the interpolation point, "a" and "b" are correction parameter values being interpolated to x, and "xa" and "xb" are x-coordinate values corresponding to the "a" and "b" values, if the "a" and "b" values are being interpolated along the x-coordinate axis. Alternatively, the y-coordinate value of the interpolation point and "ya" and "yb" that are y-coordinate values corresponding to "a" and "b" may be used for "x", "xa", and "xb", respectively, for interpolation along the y-coordinate axis.

In the example of FIGS. 4 and 5, assume that $P_2$ is 6, $P_3$ is 3, $P_5$ is 3, and $P_6$ is 0. A first interpolation value $t_1$ ($t_1$=IntX$(P_2,P_5,x_c)$) is determined by interpolation along the x-coordinate axis between P1 and P5. In that case, in the Equation 2 above, a=6, b=3, x=3, xa=4, and xb=1, such that $t_1$=5.

In addition, a second interpolation value $t_2$ ($t_2$=IntX$(P_3,P_6, x_c)$) is determined by interpolation along the x-coordinate axis between P3 and P6. In that case, in Equation 2 above, a=3, b=0, x=3, xa=4, and xb=1, such that $t_2$=2.

Thereafter, the example color correction value Ci is a third interpolation value Ci(Ci=IntY($t_1$,$t_2$,$y_c$)) determined by interpolation along the y-coordinate axis between interpolation values $t_1$ and $t_2$. In that case, in Equation 2 above, a=5, b=2, y(for x)=3, ya(for xa)=1, and yb(for xb)=4, such that Ci=3.

In this manner, bilinear interpolation (i.e., linear interpolations along both the x and y coordinate axes) is performed for determining the example color correction value Ci. Each of the color correction values $C_1$, $C_2$, . . . , and $C_n$ is generated similarly to Ci by bilinear interpolation of the subset of color correction parameters corresponding to a location of a respective pixel generating the respective one of the image signals $D_1$, $D_2$, . . . , and $D_n$. The subset of the original color correction parameters $P_1$ through $P_m$ are used when the zoom magnification Zin is "1". The subset of the modified color correction parameters $P_1'$ through $P_m'$ is used when the zoom magnification Zin is not "1".

In any case, the color correction value compensation block 64 receives the color correction values $C_1$, $C_2$, . . . , and $C_n$ from the color correction value calculation block 62. Each of the color correction values $C_1$, $C_2$, . . . , and $C_n$ indicates the respective amount of color correction to be performed for a respective one of the image signals $D_1$, $D_2$, . . . , and $D_n$ by the color correction value compensation block 64 for generating the corrected image data $V_{o1}$, $V_{o2}$, . . . , and $V_{on}$ (step S95 of FIG. 6). For example, if the example color correction value Ci is 3%, the Gr color component is determined to be greater than the Gb color component by 3% according to Equation 1.

In that case, the color correction value compensation block 64 adjusts the Gr and Gb color components corresponding to the respective digital image signal Di to increase the Gb color component by such 3% deficiency. Thus, the Gr and Gb color components are adjusted to be substantially equal from the respective digital image signal Di to generate the corresponding corrected image data $V_{oi}$. Such color compensation is performed using each of the color correction values $C_1$, $C_2$, . . . , and $C_n$ to generate the respective corrected image data $V_{o1}$, $V_{o2}$, . . . , and $V_{on}$ from the respective original image signals $D_1$, $D_2$, . . . , and $D_n$.

Alternatively, the color correction value compensation block 64 may modify the digital image signals $D_1$, $D_2$, . . . , $D_n$ by multiplication with a corresponding gain for each of the color correction values $C_1$, $C_2$, . . . , and $C_n$. Also, the color correction value compensation block 64 may multiplying the respective different color components of each of the digital image signals $D_1$, $D_2$, . . . , $D_n$ such as the respective R and B color components by corresponding gains for each of the color correction values $C_1$, $C_2$, . . . , and $C_n$.

In any case, the difference between the Gr and Gb color components is substantially corrected to be "0" for each pixel of the pixel array 30 for color correction of the image. In addition, color correction is performed with adjustment in real time according to the zoom magnification of the image sensor.

Figure 7:
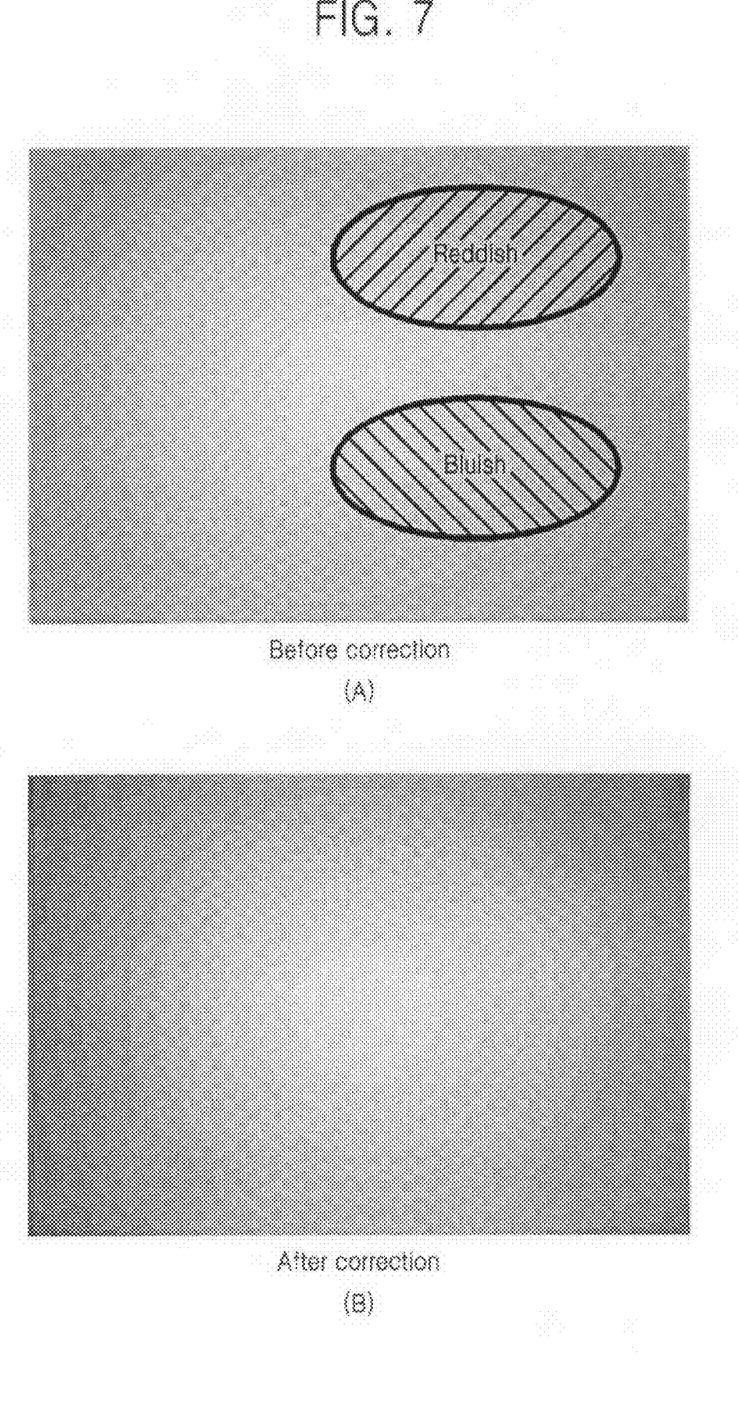
FIG. 7A is an example output image of a conventional image sensor.
FIG. 7B is an example output image of the image sensor of FIG. 1.

FIG. 7A is an example output image of a conventional image sensor, and FIG. 7B is an example output image of the image sensor of FIG. 1. FIG. 7A illustrates defective red and blue color tone portions from undesired color shading. FIG. 7B illustrates elimination of defective color tone portions using color correction by the color correction block 60.

Figure 8:
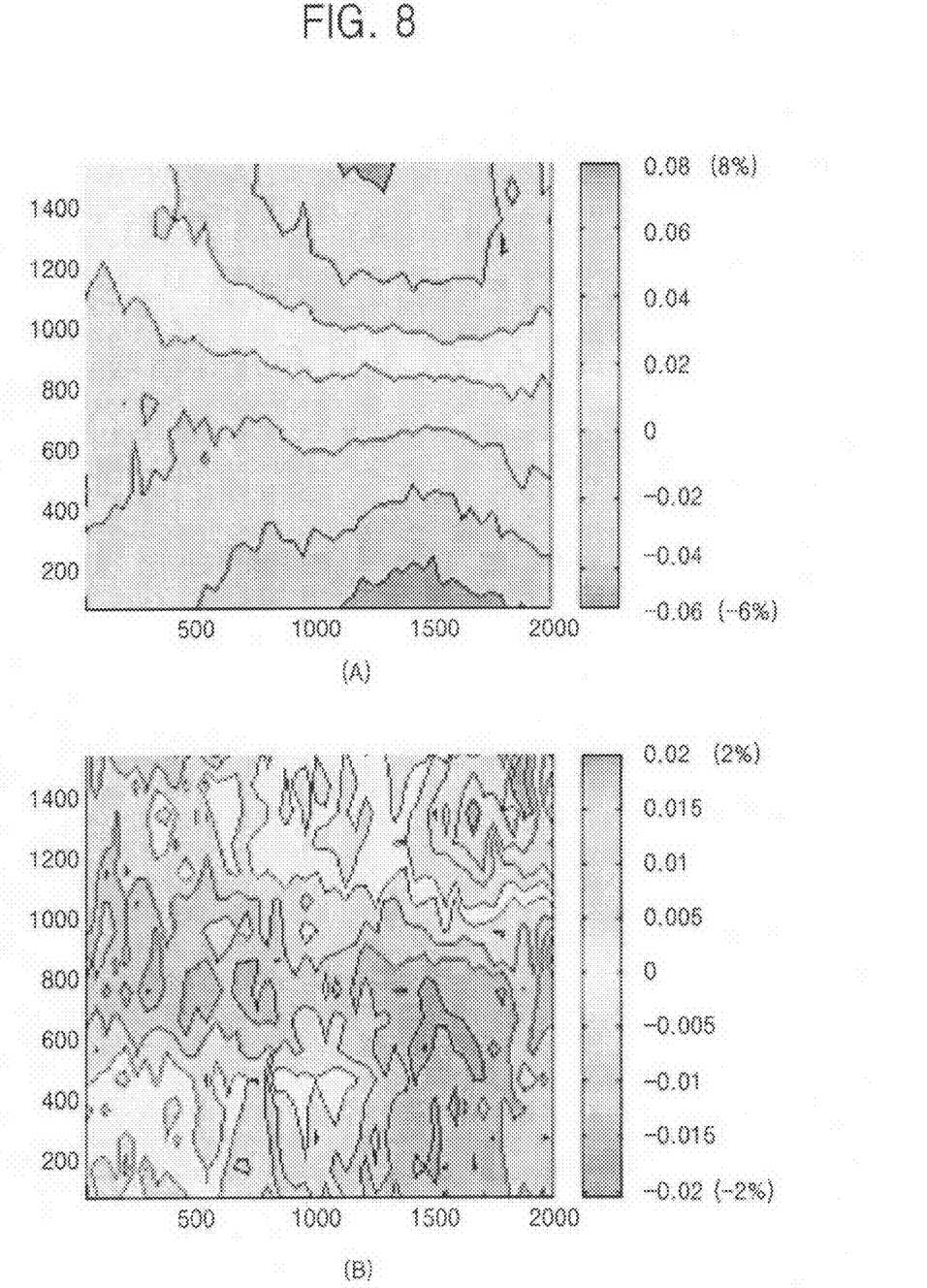
FIG. 8A is an example image showing distribution of a difference between Gr and Gb components with a conventional image sensor.
FIG. 8B is an example image showing distribution of a difference between Gr and Gb components for the image sensor of FIG. 1.

FIG. 8A is an example image showing distribution of a difference between Gr and Gb color components with a conventional image sensor, and FIG. 8B is an example image showing distribution of a difference between Gr and Gb color components for the image sensor of FIG. 1. FIG. 8A illustrates the difference between the Gr and Gb color components having a wide range of 8% to −6% with the conventional CMOS image sensor. FIG. 8B illustrates the difference between the Gr and Gb color components having smaller values 2% to −2% from color correction by the color correction block 60. Thus, since the difference between the Gr and Gb color components decreases, noise of the output image of the image sensor is removed.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

For example, the present invention may be practiced with other types of interpolation methods such as nearest neighbor replication, a median interpolation method, and an edge sensing interpolation method, aside from the example bilinear interpolation described and illustrated by way of an example embodiment.

What is claimed is:

1. An apparatus for color correction in an image sensor, comprising:

an image sensor processing block for generating a plurality of first color correction parameters corresponding to a plurality of selected pixels of the image sensor for defining a plurality of areas of a sample image, wherein the first color correction parameters correspond to when a zoom magnification is a predetermined value;

and wherein each color correction parameter represents a difference between at least two color components for a respective one of the selected pixels and wherein the image sensor processing block determines and generates modified color correction parameters using a value of the zoom magnification and the first color correction parameters, when the zoom magnification is not the predetermined value; and a color correction value calculation block for generating a respective color correction value corresponding to a given pixel from interpolation of a respective subset of the first color correction parameters corresponding to a respective one of the areas including a respective location of the given pixel, when said zoom magnification is the predetermined value, and wherein the color correction value calculation block generates the respective color correction value corresponding to the given pixel from interpolation of a respective subset of the modified color correction parameters corresponding to the respective one of the areas including the respective location of the given pixel, when said zoom magnification is not the predetermined value.

2. The apparatus of claim 1, wherein the image sensor processing block includes:

a data processor; and a memory device having sequences of instructions stored thereon, wherein execution of the sequences of instructions by the data processor causes the data processor to perform the steps of:

receiving the sample image from a pixel array of the image sensor;

dividing the sample image into a plurality of rectangles; and determining a respective color correction parameter for each corner point of the rectangles to generate the first color correction parameters, wherein the selected pixels are at the corner points of the rectangles.

3. The apparatus of claim 1, wherein the color correction value calculation block includes:
a data processor; and
a memory device having sequences of instructions stored thereon, wherein execution of the sequences of instructions by the data processor causes the data processor to perform the steps of:
determining the respective subset of the first color correction parameters corresponding to the respective location of the given pixel when said zoom magnification is the predetermined value; and
determining the respective color correction value by performing bilinear interpolation with the respective subset of the first color correction parameters from the respective location of the given pixel when said zoom magnification is the predetermined value.

4. The apparatus of claim 3, wherein execution of the sequences of instructions by the data processor causes the data processor to further perform the steps of:
determining the modified color correction parameters using the value of the zoom magnification and the first color correction parameters when the zoom magnification is not the predetermined value;
determining the respective subset of the modified color correction parameters corresponding to the respective location of the given pixel when the zoom magnification is not the predetermined value; and
determining the respective color correction value by performing bilinear interpolation with the respective subset of the modified color correction parameters from the respective location of the given pixel when the zoom magnification is not the predetermined value.

5. The apparatus of claim 1, further comprising:
a color correction value compensation block for generating a respective color corrected image signal from a respective original image signal and the respective color correction value for the given pixel.

6. The apparatus of claim 5, wherein the color correction value compensation block includes:
a data processor; and
a memory device having sequences of instructions stored thereon, wherein execution of the sequences of instructions by the data processor causes the data processor to perform the step of:
generating the respective color corrected image signal by adjusting at least one color component of the given pixel according to the respective color correction value.

7. The apparatus of claim 1, wherein the image sensor is a CMOS (complementary metal oxide semiconductor) image sensor, and wherein each color correction parameter represents a difference of respective Gr and Gb color components.

8. A method of performing color correction in an image sensor, comprising:
generating a plurality of first color correction parameters corresponding to a plurality of selected pixels of the image sensor for defining a plurality of areas of a sample image, wherein the first color correction parameters correspond to when a zoom magnification is a predetermined value;
and wherein each color correction parameter represents a difference between at least two color components for a respective one of the selected pixels;
determining and generating modified color correction parameters using a value of the zoom magnification and the first color correction parameters, when the zoom magnification is not the predetermined value; and
generating a respective color correction value corresponding to a given pixel from interpolation of a respective subset of the color correction parameters corresponding to a respective one of the areas including a respective location of the given pixel, when said zoom magnification is set to the predetermined value; and
generating the respective color correction value corresponding to the given pixel from interpolation of a respective subset of the modified color correction parameters corresponding to the respective one of the areas including the respective location of the given pixel, when said zoom magnification is not the predetermined value.

9. The method of claim 8, further including:
receiving the sample image from a pixel array of the image sensor;
dividing the sample image into a plurality of rectangles; and
determining a respective color correction parameter for each corner point of the rectangles to generate the first color correction parameters, wherein the selected pixels are at the corner points of the rectangles.

10. The method of claim 8, further including:
determining the respective subset of the first color correction parameters corresponding to the respective location of the given pixel when said zoom magnification is set to the predetermined value; and
determining the respective color correction value by performing bilinear interpolation with the respective subset of the first color correction parameters from the respective location of the given pixel when said zoom magnification is set to the predetermined value.

11. The method of claim 10, further including:
determining the modified color correction parameters using the value of the zoom magnification and the first color correction parameters when the zoom magnification is not the predetermined value;
determining the respective subset of the modified color correction parameters corresponding to the respective location of the given pixel when the zoom magnification is not the predetermined value; and
determining the respective color correction value by performing bilinear interpolation with the respective subset of the modified color correction parameters from the respective location of the given pixel when the zoom magnification is not the predetermined value.

12. The method of claim 8, further including:
generating a respective color corrected image signal from a respective original image signal and the respective color correction value for the given pixel.

13. The method of claim 12, further including:
generating the respective color corrected image signal by adjusting at least one color component of the given pixel according to the respective color correction value.

14. The method of claim 8, wherein the image sensor is a CMOS (complementary metal oxide semiconductor) image sensor, and wherein each color correction parameter represents a difference of respective Gr and Gb color components.

15. An image sensor comprising:
a pixel array;
a row decoder for activating pixels of the pixel array, each activated pixel generating a respective original image signal;

an image sensor processing block for generating a plurality of first color correction parameters corresponding to a plurality of selected pixels of the image sensor for defining a plurality of areas of a sample image, wherein the first color correction parameters correspond to when a zoom magnification is a predetermined value;

and wherein each color correction parameter represents a difference between at least two color components for a respective one of the selected pixels, and wherein the image sensor processing block determines and generates modified color correction parameters using a value of the zoom magnification and the first color correction parameters, when the zoom magnification is not the predetermined value; and a color correction value calculation block for generating a respective color correction value corresponding to a given pixel from interpolation of a respective subset of the color correction parameters corresponding to a respective one of the areas including a respective location of the given pixel, when said zoom magnification is set to the predetermined value, and wherein the color correction value calculation block generates the respective color correction value corresponding to the given pixel from interpolation of a respective subset of the modified color correction parameters corresponding to the respective one of the areas including the respective location of the given pixel, when said zoom magnification is not the predetermined value.

16. The image sensor of claim 15, wherein the image sensor processing block includes:
a data processor; and
a memory device having sequences of instructions stored thereon, wherein execution of the sequences of instructions by the data processor causes the data processor to perform the steps of:
receiving the sample image from the pixel array;
dividing the sample image into a plurality of rectangles; and
determining a respective color correction parameter for each corner point of the rectangles to generate the first color correction parameters, wherein the selected pixels are at the corner points of the rectangles.

17. The image sensor of claim 15, wherein the color correction value calculation block includes:
a data processor; and
a memory device having sequences of instructions stored thereon, wherein execution of the sequences of instructions by the data processor causes the data processor to perform the steps of:
determining the respective location of the given pixel from at least one control signal generated by the row decoder;
determining the respective subset of the first color correction parameters corresponding to the respective location of the given pixel when said zoom magnification is the predetermined value; and
determining the respective color correction value by performing bilinear interpolation with the respective subset of the first color correction parameters from the respective location of the given pixel when said zoom magnification is the predetermined value.

18. The image sensor of claim 17, wherein execution of the sequences of instructions by the data processor causes the data processor to further perform the steps of:
determining the modified color correction parameters using the value of the zoom magnification and the first color correction parameters when the zoom magnification is not the predetermined value;
determining the respective location of the given pixel from at least one control signal generated by the row decoder;
determining the respective subset of the modified color correction parameters corresponding to the respective location of the given pixel when the zoom magnification is not the predetermined value; and
determining the respective color correction value by performing bilinear interpolation with the respective subset of the modified color correction parameters from the respective location of the given pixel when the zoom magnification is not the predetermined value.

19. The image sensor of claim 15, further comprising:
a color correction value compensation block for generating a respective color corrected image signal from the respective original image signal and the respective color correction value for the given pixel.

20. The image sensor of claim 19, wherein the color correction value compensation block includes:
a data processor; and
a memory device having sequences of instructions stored thereon, wherein execution of the sequences of instructions by the data processor causes the data processor to perform the step of:
generating the respective color corrected image signal by adjusting at least one color component of the given pixel according to the respective color correction value.

21. The image sensor of claim 15, wherein the image sensor is a CMOS (complementary metal oxide semiconductor) image sensor, and wherein each color correction parameter represents a difference of respective Gr and Gb color components.

* * * * *